SOLDERLESS ELECTRICAL CONNECTION

Filed June 22, 1964

INVENTORS
V. L. Johannessen
E. E. Sterner
BY [signature]
ATTORNEY

United States Patent Office 3,317,652

Patented May 2, 1967

3,317,652

SOLDERLESS ELECTRICAL CONNECTION

Vaughn L. Johannessen and Edwin E. Sterner, Indianapolis, Ind., assignors to Western Electric Company, Incorporated, New York, N.Y., a corporation of New York Filed June 22, 1964, Ser. No. 376,752
3 Claims. (Cl. 174—68.5)

This invention relates to solderless electrical connections and, more particularly, to a reliable and simple interconnection between two terminals in the form of fixedly spaced and conductively lined openings in an article. It is an object of the invention to provide an improved electrical connection of such character.

In the manufacture of apparatus involving electrical circuitry it is commonly required that two terminals be electrically connected following the mounting of circuit components. Even where circuit boards are employed to provide electrical connections between electrical components which are incorporated in the circuit, it is sometimes required that the making of certain connections be delayed until after testing of electrically independent circuit portions. An example of this is the network commonly employed in telephones. Following the basic assembly of the network it is necessary that two circuit portions be tested while they are still electrically independent of each other. Following the testing of the two circuit portions one final connection is made to connect the two circuit portions and complete the network circuitry. The two terminals which are to be connected are, in one instance, in the form of eyelets extending through a circuit board in predetermined spaced relationship.

These eyelets constitute fixedly spaced openings with electrically conducting linings. Conventionally, these terminals are connected following test by insertion of the ends of a short length of wire into the eyelets and soldering of the wire to both eyelets. This operation involves significant cost, it occasionally fails to effect proper electrical connection, especially where the operation is performed automatically, and occasionally excess solder passes through one of the eyelets and causes a short circuit.

It is another object of the invention to provide an improved electrical connection between two terminals without the use of solder.

It is a further object of the invention to provide an improved solderless electrical connection wherein two terminals in the form of spaced openings with electrically conducting linings are reliably and simply interconnected by a connector brought into solid mechanical and electrical engagement with the terminals through simple application of pressure.

Another object of the invention is to provide an improved solderless electrical connection between two terminals in the form of fixedly spaced openings with conducting linings, the connection being readily effected with a connector which is readily inserted in the openings, and through the simple application of pressure thereto may be brought into solid electrical contact with the linings of the openings.

Still another object of the invention is to provide an improved solderless electrical connection having various of the characteristics specified above, with the connector employed being extremely simple in form, inexpensive to manufacture, and inexpensive to apply, while providing reliable electrical connection.

In accordance with the preferred embodiment of the invention a length of stiff wire is provided with two substantially 90° bends which define a central bail and two legs extending from the same side of the bail, and with a central bend defining an angle greater than 90°. The legs and the ends of the bail are inserted into two openings in a circuit board having electrically conducting linings with portions of the bail intermediate its extremities engaging the rims of the openings. The center portion of the bail may then be pressed against the circuit board such that the extremities of the bail are forced against the linings and the free ends of the legs are turned back against the other rims of the openings. The center portion of the bail is thus straightened such that it maintains the extremities of the bail in firm contact with the linings.

This invention, together with further objects and advantages thereof, will best be understood by reference to the following description taken in connection with the accompanying drawing, in which FIG. 1 is a view of a solderless electrical connector illustrating one embodiment of the invention;

Incorporated within most telephones is electrical circuitry comprising what is commonly referred to as a network. The function of this network is to equalize receiver output with varying levels of input signals, and to suppress receiver output in response to signals applied to the system by the local or associated transmitter.

The circuitry of the network is such that it is more conveniently tested when two portions thereof are electrically isolated. Following the testing of the two portions of the circuit it is necessary to make one remaining electrical connection in order to complete the circuitry.

In accordance with the invention this last connection is made through the use of a solderless connector such as the connector 10 illustrated in FIGS. 1–5. The network includes a circuit board 11 having two metal eyelets 12 extending through openings therein. These eyelets constitute the two terminals which must be connected following the testing of two electrically isolated circuit portions. The eyelets make electrical contact with corresponding circuit elements 13 which constitute parts of the circuit board 11.

The connector 10 initially has two substantially 90° bends defining a bail and two legs extending from the same side of the bail. The bail also has a central bend defining an angle greater than 90° and preferably approximately 120°.

Figure 1:
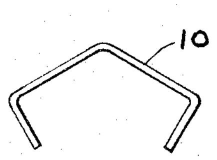
Figure 5:
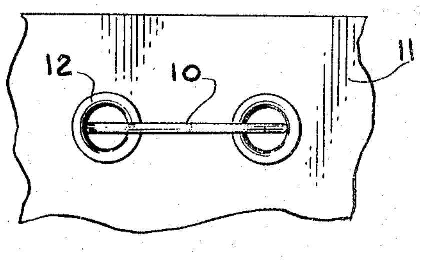
FIG. 5 is a plan view of the construction shown in FIG. 4.
Figure 2:
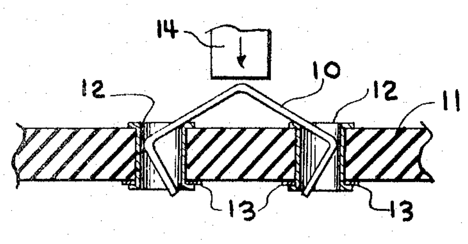
FIG. 2 is a cross-sectional view of a circuit board showing the connector of FIG. 1 inserted in two openings extending through the circuit board.

The dimensions and the configuration of the connector are such that it may be placed freely in the position with respect to the circuit board which is illustrated in FIG. 2.

With the connector 10 in this position, portions of the bail intermediate the extremities thereof are in engagement with the rims of the openings defined by the eyelets 12, the extremities of the bail lying closely adjacent the walls of the eyelets. Also, the legs of the connector extend through the openings, with the free ends of the legs closely adjacent the other rims of the openings.

Figure 3:
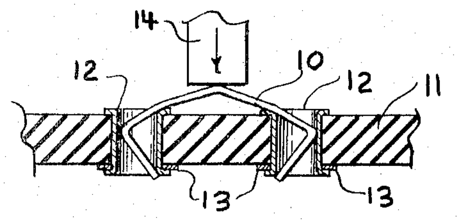
FIG. 3 is a view similar to FIG. 2 but showing the connector partially depressed.

The connector in this condition is ready for the application of pressure to the central portion of the bail by a simple tool 14. With the central portion of the bail partially depressed as illustrated in FIG. 3, the extremities of the bail are in firm contact with the walls of the eyelets, and the portions of the bail which engage the rims of the openings have been caused to bend. This turns the free ends of the legs inward toward the lower rims of the openings.

Figure 4:
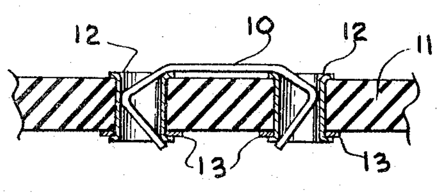
FIG. 4 is a view similar to FIGS. 2 and 3 but showing the connector in its final position.

Further advancement of the tool 14 straightens the central portion of the bail as shown in FIG. 4. This in turn causes the extremities of the bail to advance a short distance downward while bearing heavily against the walls of the eyelets. This scraping of the extremities of the bail against the walls of the eyelets provides even more solid electrical connection between the connector and the eyelets. Straightening of the central portion of the bail causes further bending of the portions of the bail which engage the upper rims of the eyelets. This turns the free ends of the legs into firm contact with the lower rims of the eyelets, to provide further electrical connection between the connector and the eyelets and mechanical locking of the connector in its desired final position.

The resulting form of the connector 10, as depicted in FIG. 4, is thus seen to comprise an intermediate flat portion between the two openings 12, coextensive with the upper surface of the article 11, and two finally formed leg portions extending from opposite ends of the intermediate portion, respectively. Each of the finally formed leg portions has at least a first section extending downwardly and outwardly into a different one of the openings, with the end of each leg portion adjacent the intermediate flat portion being in contact with the upper rim of the associated opening. A region of each of the finally formed leg portions further removed from the intermediate portion contacts the conductive lining within the associated opening. In the embodiment depicted in FIG. 4, of course, it is the vertex of the substantially 90° bend of each finally formed leg portion that contacts the lining of the associated opening, with the free end of a second section of each finally formed leg portion being spring-biased against the lower rim of the associated opening.

It should be noted that the dimension of the connector should be such that when it is initially installed in the circuit board the extremities of the bail are in proximity to the walls of the eyelets, with the result that initial starightening of the center portion of the bail forces the extremities of the bail into contact with the walls of the eyelet. If the extremities of the bail are not thus restrained, continued depression of the center portion of the bail will merely straighten the central bend such that the connector assumes a simple U-shaped configuration.

Figure 6:
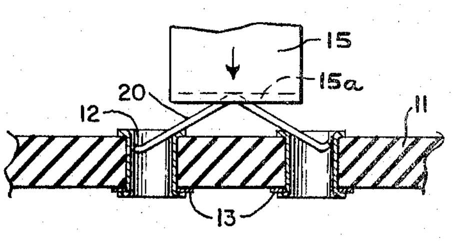
FIG. 6 is a view similar to FIG. 2 but showing an alternative embodiment of the invention.
Figure 7:
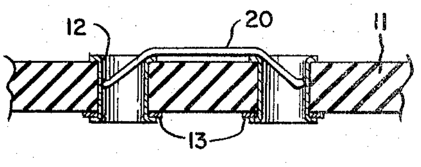
FIG. 7 is a view similar to FIG. 6 but showing the connector of FIG. 6 in final position.

A simpler embodiment of the invention is shown in FIGS. 6 and 7 which eliminates the initial legs of the embodiment described above. A connector 20, illustrating this embodiment, is shown inserted in the eyelets of the circuit board 11 in FIG. 6. Pressure against the central portion of the connector 20 by a tool 15 straightens the central portion and drives the extremities thereof against the walls of the eyelets. Since the connector 20 has a tendency to tip upon application of pressure by the tool 15, the tool is preferably provided with a shallow slot 15*a* for receiving and guiding the central portion of the connector. Preferably, the extremities of the connector 20 are turned back in the opposite sense of the central bend, as shown. The severed ends of the wire thus project upward such that the connector is firmly locked in position upon straightening of its central portion.

In the alternative embodiment of the invention illustrated in FIGS. 6 and 7 there is a saving in the length of wire at the expense of the mechanical interlock and of the additional electrical contact which is provided by the engagement of the legs with the lower rims of the openings in the embodiment of FIGS. 1–5.

In both illustrated embodiments of the invention, straightening of the central portion of the bail forces the extremities of the bail against the walls of the openings. Also, the straightened central portion of the bail provides a strong base or spine for rigidly maintaining the extremities of the bail in firm contact with the walls of the openings.

Both of the illustrated embodiments of the invention are applicable to the electrical connecting of two terminals which are in the form of spaced openings having electrically conducting linings. In the illustrated application of the invention the eyelets 12 define the openings and constitute the electrically conducting linings. It will be apparent, however, that the electrically conducting linings may be in any of various forms.

In one application of the invention the connector is of bronze with solder plating, and the eyelets are of brass with tin plating. Preferably the connector is of rectangular cross section such that the edges thereof cut into the surface of the eyelets when forced thereagainst. This not only provides superior electrical contact but provides more effective mechanical resistance to inadvertent displacement of the fully seated connector.

While various embodiments of the invention have been disclosed, many modifications will be apparent, and it is intended that the invention be interpreted as including all modifications which fall within the true spirit and scope of the invention.

What is claimed is:

1. A solderless electrical circuit connection comprising:

an article having at least two terminals in the form of fixedly spaced openings therein, with each opening having an electrically conducting lining; and a length of stiff wire interconnecting said terminals, said wire having an intermediate flat portion, coextensive with the upper surface of said article between said openings, and two leg portions extending from opposite ends of said intermediate portion, respectively, each of said leg portions having at least a first section extending downwardly and outwardly, relative to said intermediate portion, into a different one of said openings, the end of each of said leg portions adjacent said intermediate portion being in contact with the upper rim of the associated opening, and a region of each of said leg portions further removed from said intermediate portion contacting the lining within said associated opening.

2. A solderless electrical circuit connection in accordance with claim 1, wherein each of said leg portions includes an approximately 90° bend in an intermediate region thereof, said bend dividing the leg portion into said first section extending downwardly and outwardly and into a second section extending downwardly and inwardly relative to said intermediate portion, both sections being within the associated opening, and wherein the vertex of the bend of each leg portion is in contact with the lining within said associated opening, and the free end of each leg portion is spring biased against the lower rim of the associated opening.

3. A solderless electrical circuit connection in accordance with claim 1, wherein each of said leg portions includes an approximately 90° bend in an intermediate region thereof, said bend dividing the leg portion into said first section extending downwardly and outwardly and into a second section extending upwardly and outwardly relative to said intermediate portion, both sections being within the associated opening, and wherein the free end of the second section of each of said leg portions contacts the lining within the associated opening.

References Cited by the Examiner

UNITED STATES PATENTS 2,052,553 9/1936 Cavanagh ------------ 85—49

2,142,782 1/1939 Gillette -------------- 85—49

References Cited by the Applicant

UNITED STATES PATENTS 1,910,688 5/1933 Goodstein.
3,077,812 2/1963 Dietrich.

LEWIS H. MYERS, *Primary Examiner.*